United States Patent Office 3,525,395
Patented Aug. 25, 1970

3,525,395
ALTERNATE GAS AND WATER FLOOD PROCESS FOR RECOVERING OIL
Ju-Nam Chew, Dallas, Tex, assignor to Mobil Oil Corporation, a corporation of New York
No Drawing. Filed Dec. 26, 1968, Ser. No. 787,208
Int. Cl. E21b 43/18, 43/20
U.S. Cl 166—263                                    6 Claims

ABSTRACT OF THE DISCLOSURE

The specification discloses a process of alternately injecting gas and water into a reservoir that has undergone a prior waterflood to recover additional oil therefrom. The process includes a pulse step between the injection of gas and the injection of water during which the reservoir is produced by pressure generated by the gas injection. The process comprises injection of gas into a watered-out reservoir and producing same until gas breaks through at the production system. The production system is then closed in and injection of gas is continued until the pressure at the production system is equal to at least 50% of the injection pressure. The reservoir is then produced with the injection system closed until the reservoir pressure declines below a productive level. Water is then injected into the reservoir and the reservoir produced until water breakthrough. The steps are repeated until production becomes uneconomical.

BACKGROUND OF THE INVENTION

The present invention relates to a process for recovering petroleum from subterranean formations and more particularly to an improved process of alternately injecting gas and water into a reservoir for the recovery of petroleum or like minerals therefrom.

It is well known in the oil industry that so-called secondary recovery processes are employed to produce additional volumes of gas and oil from a subterranean reservoir after production by primary means has declined to an uneconomical level. The more commonly known secondary recovery procedures involve injecting drive fluids such as water into a partially depleted reservoir through an injection system to drive oil or the like toward a production system from which the oil is produced along with portions of the driving fluid. When the ratio of driving fluid to oil reaches an uneconomical level, the reservoir is normally abandoned even though a substantial amount of residual oil still remains in the reservoir.

Recently, recovery procedures have been developed wherein additional volumes of oil can be recovered from reservoirs which have already undergone normal secondary recovery operations, such as waterflooding. These procedures utilize the injection of an inert gas into a watered-out reservoir to establish a free-gas phase within the reservoir. It is believed that this gas occupies space within the reservoir which would otherwise be occupied by trapped oil thereby reducing the amount of residual oil in the reservoir. One such procedure is disclosed in U.S. Pat. No. 3,123,134, issued Mar. 3, 1964, and involves injecting gas into a watered-out reservoir in quantities and at a pressure sufficient to establish a free-gas phase therein. The gas is normally injected through injection wells while a suitable back pressure is maintained on production wells until the desired gas phase is established in the reservoir after which the injection wells are closed and the production wells are allowed to flow. After substantially no more oil can be recovered or the production rate has declined to an undesirably low level, the process may be repeated by re-establishing the high pressure free-gas phase and again reducing the reservoir pressure. This is continued until production becomes uneconomical. After the initial waterflooding operations no additional water is injected into the reservoir but instead gas is injected as the sole driving medium.

Another procedure of recovering oil from watered-out reservoirs is disclosed in U.S. Pat. No. 3,244,228, issued Apr. 5, 1966, and involves alternately flooding the reservoir with gas and water. Gas is injected into a watered-out reservoir or the waterflooded portion of an existing waterflooding operation until a desired gas saturation exists in the reservoir. Without pause, water is then injected and the gas-water injection cycles repeated until the water-oil ratio becomes uneconomical. However, even with alternate gas-water flooding, such as described above, significant residual oil still remains in the reservoir at the completion of such processes.

SUMMARY OF THE INVENTION

The present invention provides an improved process for recovering petroleum from a reservoir that has undergone waterflooding operations.

The process defined by the present invention involves alternately flooding a watered-out reservoir with inert gas and water in such a manner that the ultimate recovery of petroleum therefrom is increased. The process includes a pulse step between the gas and the water injection steps which adds to the overall efficiency of the recovery operation. More specifically, the process of the present invention is as follows.

Inert gas under pressure is injected through an injection system into a reservoir until the gas breaks through at the production system. The production system is then closed and injection of gas is continued until the pressure at the production system is equal to at least 50% of the injection pressure. The injection system is then closed and the production system is opened to allow the reservoir to produce under pressure decline until the production rate becomes uneconomical. Water is the injected through the injection system until breakthrough at the production system. At this time the above steps may be repeated in sequence until the final oil production becomes uneconomical. The actual operation and the apparent advantages of the invention will be better understood by referring to the following detailed description.

DESCRIPTION OF THE PREFERRED EMBODIMENT

The present invention provides an improved recovery process for recovering additional amounts of residual oil from a subterranean reservoir which has undergone prior waterflooding operations. To be more explicit, the present process is carried out in a "recovery zone" of a watered-out portion of an oil-bearing reservoir. As will be understood by those skilled in the art, the term "recovery zone" as used herein and in the appended claims means that portion of a reservoir through which oil is displaced from an injection system to the production system by an injected fluid. The injection and production systems may comprise one or more wells extending from the surface of the earth into the recovery zone and such wells may be located and spaced from one another in any desired pattern. For example, the so-called "line flood" pattern may be utilized, in which case the injection and production systems comprise rows of wells spaced from one another. In this type pattern the recovery zone as defined by the spaced rows of injection and production wells generally will be that portion of the reservoir underlying the area between these spaced rows. Exemplary of other patterns which may be used is the so-called "circular flood" pattern in which the injection system comprises a central injection well and the production system a plurality of production wells spaced radially about the injection well. Of course, the injection and production systems each may consist of only a single well in which case the recovery zone as defined by the spaced injection and production wells will be the portion of the reservoir underlying a generally elliptical area between these wells which is subject to the displacing action of the injected flooding medium. The above and other patterns are well known to those skilled in the art and for a more detailed description of such patterns, as well as waterflood techniques in general, reference is made to Uren, L. C., Petroleum Production Engineering-Oil Field Exploitation, 2nd ed., McGraw-Hill Book Company, Inc., New York and London, 1939, and more particularly to the section entitled, "The Water Flooding Process," appearing at pages 444–459.

It also will be recognized that the invention may be carried out utilizing one or more dually completed injection-production wells of the type, for example, disclosed in United States Pat. No. 2,725,106. This arrangement sometimes may be utilized to advantage in a relatively thick oil reservoir in which it may be desirable to displace the oil in the reservoir upwardly and recover such oil from the upper portion of the reservoir. In this instance, the injection system normally would comprise the lower completion interval of one or more dually completed wells of the type described in the aforementioned patent U.S. No. 2,725,106 and the production system would comprise the upper completion interval of one or more of such wells. In this case, of course, the recovery zone would be that portion of the reservoir subject to the displacing action of the flooding medium as it moves upward through the reservoir.

In carrying out the invention, inert gas, e.g., air, flue gas, nitrogen, carbon dioxide, combinations thereof, etc., is injected at a relatively high pressure through an injection system into the recovery zone of a reservoir which has previously undergone a waterflooding operation. Preferably, the injection pressure approaches a value substantially equal to the original pressure at which the reservoir was prior to any production, but it must be low enough to prevent fracturing of the reservoir formation. Injection of gas is continued until the gas breaks through at the production system. The production system is then closed and, preferably, gas injection is continued until the pressure is substantially uniform throughout the recovery zone at a value approaching the injection pressure. This build up of pressure by injection of gas with the production system closed constitutes the first part of a pulse step that takes place between the gas injection step and the subsequently described water injection step. In some reservoirs it may be desirable to "soak" the recovery zone at the elevated pressure. This is done by closing in injection and production systems for a predetermined period of time after the desired pressure is reached. This time period may range from days to months, depending upon the actual reservoir characteristics involved. By soaking the reservoir, more of the injected gas under the elevated pressure is believed to diffuse into the trapped oil within the pores of the recovery zone and ultimately aids in the overall recovery efficiency.

In some reservoirs, due to certain formation characteristics, e.g., permeability, it may take a prohibitive amount of time and/or gas to raise the pressure of the recovery zone to a value approximating the injection pressure. If this be the case, the injection system can be closed whenever the pressure of the production system reaches a value equal to at least 50% of the injection pressure. Production can then be resumed without any additional soaking time if desired, or the recovery can be "soaked" until the pressure becomes uniform throughout the formation. However, the oil recovery per cycle in such cases will be less than that where higher pressures are reached at the production system.

When the pressure in the recovery zone at the production system is approximately equal to the pressure at the injection system or reaches a value equal to at least 50% of the injection pressure in the second situation set forth above, the injection system is closed. The production system is opened and the recovery zone is allowed to produce under the influence of the elevated pressure within the recovery zone until said pressure declines to a value too low to provide economic production. This forms the second part of the pulse step and is commonly referred to as "blowdown." During this second part of the pulse step, bubbles of gas are thought to form in the pores of the recovery zone which contain trapped oil and thereby expel the portions of said oil from the pores into flow channels which lead to the production system.

When oil production from the pulse step declines to an undesirable level, the injection system is opened and water is injected into the recovery zone. The term "water" as used here can be any flooding liquid normally used in waterflooding operations, e.g., fresh water, brines, water with or without additives such as thickeners, emulsions, etc. The water is injected at least until breakthrough occurs at the production system or until the time thereafter at which uneconomical production occurs. When this happens, the above steps may be repeated in sequence until the final oil production becomes uneconomical.

To illustrate further the present invention, reference is made to a series of laboratory experiments which were carried out to compare the recovery of the present invention which includes a pulse step to that of other alternate gas-water flood processes which do not include a pulse step. The experiments were run in a Hassler-type cell on 2-inch diameter by 1-foot long cylindrical cores of Berea sandstone which had the following characteristics: porosity=18.4%; pore volume=110 milliliters; permeability=95 millidarcies; and the axis of the core along the bedding plane.

The initial oil saturation in each core was established by first completely saturating the core with a 5% salt-water solution and then injecting oil (kerosene) into the core until the fluid being produced contained less than 1% water. The volume of oil retained in the core was equal to the volume of water produced after corrections for fluid in lines and fittings were made. The oil flood was made under the same pressure conditions as those chosen for subsequent steps in a particular run. In each run, an oil-saturated core underwent an initial waterflood step until the water-oil ratio of the produced fluid reached 100:1. Nitrogen was the gas used.

One process (designated Process A below) simulated an alternate gas-water flood after initial waterflood without any back pressure being maintained at the production end of the core and without any pulse step between the gas injection and the water injection steps. Another process (Process B) simulated an alternate gas-water flood after an initial waterflood with substantial back pressure being maintained at the production end and without a pulse step between the gas injection and the water injection steps. A third process (Process C) simulated an alternate gas-water flood in accordance with the present invention and did include a pulse step between the gas injection and water injection steps. Average results for more than one run of each process are summarized in the following table.

|  |  | Process A, 2 runs | Process B, 2 runs | Process C, 3 runs |
|---|---|---|---|---|
| Initial saturations, percent pore volume | Oil | 51.1 | 51.8 | 49.2 |
|  | Water | 49.9 | 48.2 | 50.8 |
|  | Gas | 0.0 | 0.0 | 0.0 |
| Saturations after waterflood, percent pore volume | Oil | 34.4 | 35.2 | 32.4 |
|  | Water | 65.6 | 64.8 | 67.6 |
|  | Gas | 0.0 | 0.0 | 0.0 |
| Recovery by initial waterflood, percent original oil in place |  | 32.6 | 32.0 | 34.1 |
| Residual saturation after 4 gas steps alternated with 3 water steps | Oil | 22.3 | [1] 22.4 | 19.2 |
|  | Water | 53.0 | 42.5 | 47.4 |
|  | Gas | 24.7 | 35.1 | 33.4 |
| Process recovery percent of oil remaining after waterflood |  | 35.2 | 36.4 | 40.7 |

[1] A fourth gas step was not used, blowdown followed the third water step.

NOTE:
Process A: Alternate gas and water injection after waterflood. No back pressure, No pulse step. (Pressures: Injection=300 p.s.i.g., Production=0 p.s.i.g.).
Process B: Alternate gas and water injection after waterflood. With back pressure, No pulse step. (Pressures: Injection=400 p.s.i.g., Production=200 p.s.i.g.).
Process C: Alternate gas and water injection after waterflood. With pulse step. (Pressures: Injection=300 p.s.i.g., Production=0 p.s.i.g.).

In comparing the above results, it can be seen that the process of the present invention which included a pulse step recovered a greater percentage of the residual oil remaining in a core after initial waterflood than either of the other two alternate gas-water floods which did not include such a step.

What is claimed is:

1. A process for recovering petroleum from a recovery zone of a previously waterflooded, subterranean reservoir having an injection system and a production system extending into said recovery zone, said process comprising:

injecting inert gas at an injection pressure into said recovery zone through said injection system while producing fluids from the recovery zone through said production system;
closing said production system when said inert gas breaks through at said production system;
continuing injection of inert gas through said injection system until the pressure at the production system is substantially equal to said injection pressure;
ceasing injection of inert gas and closing said injection system;
opening said production system and allowing fluids to be produced from said recovery zone under the influence of the pressure within said recovery zone;
opening said injection system when the pressure within said recovery zone declines to a value too low to provide a desirable level of production of fluids; and
injecting water through said injection system into said recovery zone while producing fluids from said production system.

2. The process of claim 1 including:
ceasing injection of water at water breakthrough at said production system; and
repeating the above cycle.

3. The process of claim 1 wherein:
said injection pressure is substantially equal to the original pressure within the recovery zone prior to any production therefrom.

4. A process for recovering petroleum from a recovery zone of a previously waterflooded, subterranean reservoir having an injection system and a production system extending into said recovery zone, said process comprising:

injecting inert gas at an injection pressure into said recovery zone through said injection system while producing fluids from the recovery zone through said production system;
closing said production system when said inert gas breaks through at said production system;
continuing injection of inert gas through said injection system until the pressure at the production system reaches a value equal to at least 50% of the injection pressure;
ceasing injection of inert gas and closing said injection system;
opening said production system and allowing fluids to be produced from said recovery zone under the influence of the pressure within said recovery zone;
opening said injection system when the pressure within said recovery zone declines to a value too low to provide a desirable level of production of fluids; and
injecting water through said injection system into said recovery zone while producing fluids from said production system.

5. The process of claim 4 including:
ceasing injection of water at water breakthrough at said production system; and
repeating the above cycle.

6. The process of claim 4 wherein:
said injection pressure is substantially equal to the original pressure within the recovery zone prior to any production therefrom.

References Cited

UNITED STATES PATENTS

| 3,123,134 | 3/1964 | Kyte et al. | 166—263 |
| 3,175,609 | 3/1965 | Csaszar et al. | 166—263 |
| 3,244,228 | 4/1966 | Parrish | 166—274 X |

ERNEST R. PURSER, Primary Examiner

I. A. CALVERT, Assistant Examiner

U.S. Cl. X.R.

166—274